United States Patent [19]

Guerlet et al.

[11] Patent Number: 5,051,235

[45] Date of Patent: Sep. 24, 1991

[54] NOVEL PALLADIUM-BASED ALLOYS CONTAINING INDIUM BISMUTH, SILVER AND COPPER

[75] Inventors: Jean-Paul Guerlet, Paris; Dan Weber, Presles, both of France

[73] Assignee: Comptoir Lyon-Alemand-Louyot, Societe Anonyme, France

[21] Appl. No.: 463,832

[22] Filed: Jan. 8, 1990

Related U.S. Application Data

[63] Continuation of Ser. No. 210,393, Jun. 23, 1988, abandoned.

[30] Foreign Application Priority Data

Jun. 26, 1987 [FR] France ............................. 87 09082

[51] Int. Cl.$^5$ ............................................. C22C 5/04
[52] U.S. Cl. .............................................. 420/463; 65/1; 65/374.1; 65/374.12; 373/27; 373/28; 420/464; 420/465; 420/587; 420/589
[58] Field of Search ............... 420/463, 464, 465, 587, 420/589; 65/1, 374.1, 374.12; 373/27, 28

[56] References Cited

U.S. PATENT DOCUMENTS

| | | |
|---|---|---|
| 1,913,423 | 6/1933 | Wise .................... 420/463 |
| 1,924,097 | 8/1933 | Aderer ................. 420/464 |
| 1,990,277 | 2/1935 | Feussner et al. ...... 420/463 |
| 2,070,271 | 2/1937 | Gwyn, Jr. ............. 420/465 |
| 2,095,890 | 10/1937 | Powell et al. ........ 420/464 |
| 2,132,116 | 10/1938 | Kiepe .................. 420/464 |
| 2,226,079 | 12/1940 | Spanner ............... 420/463 |
| 2,310,732 | 2/1943 | Dietz ................... 420/463 |
| 2,903,353 | 9/1959 | Bredzs ................. 420/464 |
| 3,085,320 | 4/1963 | Rhys .................... 420/464 |
| 3,134,671 | 5/1964 | Prosen ................. 420/465 |
| 3,136,634 | 6/1964 | Zwingmann .......... 420/463 |
| 3,155,467 | 11/1964 | Yamamoto et al. .... 420/463 |
| 3,804,616 | 4/1974 | Goltsov et al. ....... 420/465 |
| 3,819,366 | 6/1974 | Katz .................... 420/463 |
| 4,319,877 | 3/1982 | Boyajian .............. 420/463 |
| 4,336,290 | 6/1982 | Tsai ..................... 420/463 |
| 4,387,072 | 6/1983 | Schaffer ............... 420/464 |
| 4,400,350 | 8/1983 | Wagner ................ 420/464 |
| 4,412,970 | 11/1983 | Prasad ................. 420/463 |
| 4,451,639 | 5/1984 | Prasad ................. 420/464 |
| 4,518,564 | 5/1985 | Prasad ................. 420/464 |
| 4,569,825 | 2/1986 | Dvivedi et al. ....... 420/464 |
| 4,579,787 | 4/1986 | Heidsiek et al. ...... 420/463 |
| 4,591,483 | 5/1986 | Nawaz ................. 420/463 |
| 4,608,229 | 8/1986 | Lanam et al. ......... 420/464 |

FOREIGN PATENT DOCUMENTS

| | | |
|---|---|---|
| 635935 | 2/1962 | Canada ................ 420/463 |
| 585545 | 9/1933 | Fed. Rep. of Germany ...... 420/463 |
| 893571 | 10/1953 | Fed. Rep. of Germany ...... 420/463 |
| 1022385 | 1/1958 | Fed. Rep. of Germany ...... 420/463 |
| 3304183 | 4/1984 | Fed. Rep. of Germany ...... 420/464 |
| 3304598 | 8/1984 | Fed. Rep. of Germany ...... 420/463 |
| 3406711 | 4/1985 | Fed. Rep. of Germany ...... 420/463 |
| 3624149 | 7/1987 | Fed. Rep. of Germany . |
| 15455 | 9/1962 | Japan .................. 420/463 |
| 15456 | 9/1962 | Japan .................. 420/463 |
| 128524 | 11/1978 | Japan .................. 420/464 |
| 48168 | 12/1978 | Japan .................. 420/464 |
| 107436 | 6/1983 | Japan .................. 420/463 |
| 113142 | 6/1984 | Japan .................. 420/463 |
| 150041 | 8/1984 | Japan .................. 420/464 |
| 229436 | 12/1984 | Japan .................. 420/463 |
| 103142 | 6/1985 | Japan .................. 420/463 |
| 186437 | 8/1986 | Japan . |
| 20849 | 1/1987 | Japan . |
| 30830 | 2/1987 | Japan . |
| 56544 | 3/1987 | Japan . |
| 8001820 | 10/1981 | Netherlands ......... 420/464 |
| 250457 | 8/1969 | U.S.S.R. .............. 420/463 |
| 389167 | 7/1973 | U.S.S.R. .............. 420/463 |
| 6367 | of 1886 | United Kingdom .. 420/464 |
| 510640 | 8/1939 | United Kingdom .. 420/464 |
| 1139897 | 1/1969 | United Kingdom .. 420/463 |
| 1242921 | 8/1971 | United Kingdom . |
| 2048939 | 12/1980 | United Kingdom .. 420/463 |

OTHER PUBLICATIONS

Parfenova et al. "Structure and Properties of palladium-ruthenium-indium alloys." Chemical abstract 105(14):119123u.

Roshan et al. "Hydrogen permeability and mechanical properties of palladium-indium and palladiun-indium-ruthenium alloys." Chemical Abstract 100(2):11270x.

*Primary Examiner*—R. Dean
*Assistant Examiner*—David Schumaker
*Attorney, Agent, or Firm*—Brumbaugh, Graves, Donohue & Raymond

[57] ABSTRACT

The invention relates to a novel palladium-based alloy.

This palladium-based alloy comprises at least one additional element selected from indium, bismuth, silver and copper, in an amount sufficient to impart an acceptable resistance to corrosion by molten glass, preferably being essentially equivalent to that of platinum-rhodium 10% alloys.

An alloy of this type can be used in the glass industry for making components which come into contact with molten glass, which preferably essentially contains no oxides less stable than the oxide of the additional element, such as lead oxide, because is has an excellent resistance to corrosion by molten glass and is less expensive than the platinum-rhodium 10% alloy normally used. Moreover, by the addition of at least one element selected from platinum (0–50% by weight), rhodium (0–20% by weight), iridium (0–20% by weight), ruthenium (0–20% by weight) and tin (0–20%), the mechanical strength at high temperature, especially the creep strength, is significantly improved.

22 Claims, No Drawings

NOVEL PALLADIUM-BASED ALLOYS CONTAINING INDIUM BISMUTH, SILVER AND COPPER

This application is a continuation of application Ser. No. 210,393, filed on 6/23/88, abandoned.

The present invention relates to novel palladium-based alloys containing at least one additional element selected from the group consisting of indium, bismuth, copper and silver, which can be used especially in the glass industry for making components which come into contact with liquid glass, and to the use of these alloys in the glass industry.

The invention also relates to a process for the protection against corrosion of components used in the glass industry which may come into contact with molten glass, and to the components obtained by this process.

Since it first started, the glass industry has been faced with the problem of the corrosion resistance of components in contact with molten glass. In fact, the metal parts of the industrial installations operate in air and at temperatures which can vary according to the type of glass, but which are generally between 1100° C. and 1400° C. Now, there are only a very few metals which are capable of withstanding such a harsh environment by simultaneously having a good resistance to oxidation, a good resistance to corrosion by molten glass and adequate mechanical characteristics at these temperatures.

These severe constraints explain the quasi-systematic use of platinum alloys in all cases where the corrosion resistance is the factor of primary importance. The fiber-drawing spinnerets for the manufacture of glass fibers are one of the best examples insofar as the three factors mentioned above, combined with strict quality criteria for the final product, are such that Pt Rh 10% and Pt Rh 20% alloys are used exclusively.

However, although the properties of platinum alloys have been recognized for a very long time for applications in the glass industry, the cost of precious metals has always restricted their use and has always been a powerful driving force in the search to develop replacement materials.

Thus several families of alloys have been studied, but these studies have not resulted in solutions which can actually be used in place of platinum-rhodium alloys.

As stainless steels do not have adequate characteristics, the studies have been directed towards the use of superalloys based on nickel-chromium, which are of the same type as those developed for the aeronautical industry. The mechanical characteristics at high temperature obtained with these alloys in recent years are remarkable, in particular the creep strength.

These characteristics are very distinctly superior to those of the conventional platinum-rhodium alloys, at least up to 1200° C., and substantially better than those of platinum alloys reinforced by a dispersion of oxides. Furthermore, the resistance to oxidation of these superalloys has been improved by the addition of very readily oxidizable elements such as, for example, aluminum. The function of these additions is to form a surface layer of oxide which protects the parent metal.

However, because of more or less substantial discontinuities in this surface layer, the protection is very imperfect. Degradation of the resistance to oxidation becomes more pronounced as the temperature increases and becomes incompatible with industrial use above 1200° C.

Moreover, the resistance of this type of alloy to corrosion by molten glasses is still very inadequate. In fact, where metal and glass are in contact, complex reactions take place between the oxides in the glass and the surface oxides. These reactions result in the disappearance of the protective layer and cause accelerated corrosion of the parent metal.

It is for this reason that, although having excellent mechanical characteristics, alloys of this type cannot be used in the glass industry when the temperature exceeds 1200° C. or when the quality criteria of the glass prohibit any pronounced corrosion of the metallic materials.

In an attempt to mitigate these major disadvantages of platinum-rhodium alloys and non-oxidizing alloys, the inventors have carried out researches on another family of replacement alloys, namely palladium-based alloys, because of the fact that, although it is a precious metal belonging to the platinoid group, palladium is considerably less expensive than platinum.

This search for palladium-based replacement alloys ran counter to the teaching of those skilled in the art, since it had hitherto been impossible to use palladium alloys in the glass industry because of the appreciable corrosion of these alloys in contact with molten glasses.

In fact, experiments show that pure palladium or palladium-platinum alloys containing up to 50% of platinum exhibit pronounced intergranular corrosion in contact with a conventional molten glass (alkali-lime glass or E glass. Surface etching of the grain boundaries can be observed after only a few dozen hours of testing. The degree of intergranular attack increases with the exposure time, causing mechanical embrittlement which is unacceptable in use.

One object of the present invention is thus to overcome the above-mentioned disadvantages of platinum-rhodium or non-oxidizing alloys by proposing a novel family of replacement alloys which have an acceptable resistance to corrosion by molten glass, preferably being essentially equivalent to that of platinum-rhodium 10% alloys, and thus possess use characteristics essentially identical to those of the platinum-rhodium 10% alloys in general use, and whose production cost is substantially less than that of the known alloys.

Another object of the present invention is to solve the new technical problem of providing a novel family of palladium-based replacement alloys which have an acceptable resistance to corrosion by molten glass, preferably being essentially equivalent to that of platinum-rhodium 10% alloys, and which simultaneously have good mechanical properties at ambient temperature and at high temperature, and especially a good creep strength, in particular at high temperature and more particularly under industrial use conditions at 1100° C.-1400° C.

The present invention provides the first satisfactory solution to all these technical problems by proposing a novel family of alloys which can be used especially in the glass industry.

Thus, according to a first aspect, the present invention relates to a palladium-based alloy which can be used especially in the glass industry for making components which come into contact with molten glass, which is preferably a glass essentially containing no oxides less stable than the oxide of the additional element, such as lead oxide, the said alloy comprising at least one additional element selected from indium, bismuth, silver and copper, in an amount sufficient to impart an acceptable resistance to corrosion by molten glass, preferably being essentially equivalent to that of platinum-rhodium 10% alloys.

Advantageously, the above-mentioned additional element is indium or bismuth.

In a preferred embodiment, this palladium-based alloy according to the invention comprises at least one of the following elements (amounts in percentages by weight):

| Indium | 2-20%, preferably 5-15% |
|---|---|
| Bismuth | 2-20%, preferably 5-15% |
| Copper | 5-20% |
| Silver | 5-30% |

These alloys have a very good compatibility with alkali-lime glasses in the liquid state and corrosion tests in the liquid glass show no signs of degradation after residence times of between 100 and 500 h.

In a particularly advantageous embodiment, this palladium-based alloy according to the invention also comprises at least one of the following elements (amounts in percentages by weight):

| Platinum | 0-50, preferably 5-40 |
|---|---|
| Ruthenium | 0-20, preferably 0.5-10 |
| Rhodium | 0-20, preterably 0.5-10 |
| Iridium | 0-20, preferably 0.5-10 |
| Tin | 0-20, preferably 0.5-10 |

Furthermore, according to a particular characteristic of the invention, when platinum is present in the alloy according to the invention, it constitutes the remainder of the alloy.

Among these alloys, very particular preference will be given to palladium-indium-ruthenium ternary alloys, whose creep strength properties are remarkable.

In particular, the alloy pd, In 5, Ru 5 has a creep strength which is practically identical to that of a Pt Rh 10% alloy.

In a particular modified embodiment, the alloys according to the invention can be reinforced through the formation of a disperse phase by using already known processes for the production of materials containing disperse phases, which can be used to advantage, whether this be structural hardening, powder metallurgy, schooping, or the like.

In another modified embodiment, the alloys according to the invention can be reinforced by internal oxidation after the addition, if appropriate, of an element such as tungsten, yttrium or lanthanum.

According to a second aspect, the present invention relates to the use of these alloys in the glass industry for making components which come into contact with molten glass, which is preferably a glass essentially containing no oxides less stable than the oxide of the additional element used, such as lead oxide.

According to a third aspect, the present invention relates to a process for the protection against corrosion by molten glass of components used in the glass industry, which consists in making at least some parts of the said components, especially the parts which may come into contact with molten glass, which is preferably a glass essentially containing no oxides less stable than the oxide of the additional element, such as lead oxide, of a palladium-based alloy containing an additional element, as defined previously.

Finally, according to a fourth aspect, the present invention relates to those components used in the glass industry which may come into contact with molten glass, of which at least some parts, especially the parts which may come into contact with molten glass, are made of a palladium-based alloy containing an additional element, as defined previously.

The invention is based on the discovery, which is totally surprising to those skilled in the art, that the addition of an element selected from indium, bismuth, copper and silver to palladium-based alloys imparts to these alloys an acceptable resistance to corrosion by molten glasses.

In applications where corrosion does not have to be absolutely absent, copper or silver, by themselves or in combination, may be used as the additional element. However, in applications where corrosion does have to be absolutely absent, it will be obligatory to choose at least one additional element selected from indium and bismuth and optionally at least one element selected from copper and silver.

It has been discovered that the excellent behavior of the alloys according to the invention is due to suppression of the intergranular corrosion observed in palladium and palladium-platinum alloys. This phenomenon is explained in the following way, although this explanation is not intended to imply a limitation.

The very readily oxidizable impurities (Al, Mg, etc.) present in the parent metal generally undergo segregation at the grain boundaries. In the presence of molten glass, some of whose oxides can be reduced by these impurities, oxidation-reduction reactions take place.

Consequently the silicon, in particular, which is released in these reactions can diffuse and form Pd-Si phases in a very localized manner at the grain boundaries, the said phases being liquid at these temperatures. These phases dissolve in the molten glass and then initiate a chain reaction of oxidation-reduction-dissolution of the Pd-Si phases, which leads to the intergranular corrosion demonstrated by experimental observations.

The additions according to the invention fundamentally modify the reactions which occur by very effectively blocking the diffusions into the grain boundaries. The corrosion mechanism is consequently stopped or very greatly slowed down. It is important to note that the corrosion resistance of these alloys is only assured in glasses containing no oxides less stable than the oxide of the additional metallic element. If this is not the case, these oxides will be reduced by the additional element (In, Bi) and the metallic elements thereby released will be able to diffuse into the grain boundaries. This occurs in particular in the case of crystal glasses containing lead oxide. The corrosion of these alloys in glasses of this type is extremely rapid.

The mechanical characteristics of the alloys according to the invention at ambient temperature are superior to those of platinum-rhodium 10% alloys. Their ductility at ambient temperature is excellent, making it possible to perform necessary conversions under perfectly conventional conditions with no appreciable difference compared to platinum-rhodium 10% alloys. The mechanical characteristics at high temperature, and more particularly the creep strength, depend on the alloyed elements and any other additions.

In the range of temperatures used for the applications in the glass industry for which the alloys of the present invention are intended, the creep strength of the binary alloys is equivalent to that of platinum but is still lower than that of platinum-rhodium 10% alloys. However, taking into account the large differences in density and metal cost, these alloys have a very favorable characteristic ratio of creep strength to cost.

The creep strength, which is very important particularly in the case of fiber-drawing spinnerets, can be considerably improved in the alloys according to the invention by means of particular additions or conventional production processes.

For this reason, according to a particular characteristic of the invention which makes it possible to improve the mechanical strengths of the alloys according to the invention, especially the creep strength, at high temperature, the invention recommends the addition of platinoid elements (0 to 50% by weight of platinum; 0 to 20% by weight of rhodium; 0 to 20% by weight of iridium; 0 to 20% of ruthenium), these additions being made together or separately, or of tin (0 to 20%).

Of course, the amounts of these elements are determined according to the desired economic advantage.

In general, the palladium content of the alloys according to the invention will be between 45 and 98%, preferably between 80 and 95% by weight. In other words, the additions will generally represent from 2 to 55% by weight of the alloy and preferably from 5 to 20% by weight.

The alloys according to the invention can also be reinforced by means of a disperse phase. This technique is well known to those skilled in the art as already being in use in industry for a number of materials intended for high-temperature applications (superalloy, platinum-rhodium alloy). The processes which are already known for the production of materials containing disperse phases can be applied to the alloys according to the invention: structural hardening, powder metallurgy and schooping.

Furthermore, the alloys according to the invention are capable of being reinforced by internal oxidation because oxygen diffuses easily into palladium-based alloys. This production technique, which is well known in the case of silver alloys for electrical contacts, can be successfully applied to the alloys according to the invention. Therefore, either the additional element itself indium) or an element specifically added for this purpose (tungsten, yttrium, lanthanum, etc.) can be oxidized internally and homogeneously.

The invention will be illustrated in greater detail by the following Examples, which are given without limiting the scope of the invention. In the Examples, all the percentages are given by weight, unless indicated otherwise.

EXAMPLES 1 to 5

The palladium-based alloys whose compositions are given in Table 1 are prepared by vacuum melting. The ingot is hot-forged at a temperature of 1200° C. down to a thickness of 10 mm. It is then cold-rolled down to 1 mm.

The creep strength of these alloys, measured on flat 1 mm thick test-pieces, is given in Table I and compared with platinum and platinum-rhodium 10% alloys.

Characterization of the materials in the presence of molten glass was carried out by means of three behavior tests:

a static test of corrosion by molten glass at constant temperature (1200° C.) for periods of 100 to 500 hours. In this test, a plate of the material is immersed in liquid glass, the whole being at the appropriate temperature in a furnace. After the test, macrographic and micrographic observations make it possible to assess any coloration of the glass add the corrosion phenomena in the molten glass and at the metal/molten glass/air interface.

a test of corrosion in the presence of molten glass on a plate heated by the Joule effect. It is a very generalized practice in the glass industry to heat the spinnerets by the Joule effect.

Any influence of the electric current on the corrosion by molten glass is therefore studied by this type of test. The test is carried out by heating a 0.5 mm thick plate by means of an alternating current at a current density of 40 $mA/cm^2$. A small amount of glass is placed on the plate and is melted when the plate heats up.

The temperature is measured by a thermocouple immersed in the liquid glass. The test is carried out at two temperatures (1200° C. and 1350° C.) for a period of 72 h.

The general conditions of the tests (current density, temperature) were chosen to represent the use conditions in the glass industry. Because the heat losses are substantially greater in the test than in industrial use, the current density is also fairly substantially higher than that normally employed in industry. This makes the test even more severe.

a prototype behavior test. This test is carried out on a crucible with a capacity of about 500 $cm^3$. The bottom of the crucible consists of a spinneret enabling the glass to be drawn into fibers.

The tests of corrosion in E glass and alkali-lime glass were carried out at 1200° C. for 100 to 500 h. The samples showed no signs of corrosion after the tests. Palladium tested under the same conditions showed very pronounced intergranular attack.

EXAMPLES 6 TO 9

The alloys whose compositions are indicated in Table II are produced under the same conditions as in Examples 1 to 5.

An oxidation treatment for 72 h at 1200° C. in air is carried out on the samples before the creep tests and the tests of corrosion in liquid glass.

The creep characteristics as a function of temperature are improved by this oxidation treatment because of the presence of a disperse phase of oxides. These are indium oxides in Examples 6 to 8 and tungsten oxide in Example 9. Similar results are obtained with the addition of yttrium or lanthanum in place of tungsten.

Furthermore, the resistance to corrosion by liquid glass is slightly degraded by the presence of the oxides in the metal on account of reactions between these oxides and the liquid glass. However, the laboratory tests performed (testing times of 100 to 500 hours) suggest that the resistance to corrosion by liquid glass is on the whole satisfactory.

TABLE I

CREEP STRENGTH AT HIGH TEMPERATURE

| | Creep strength at 1000° C. Load for a rupture time of | | Creep strength at 1200° C. Load for a rupture time of | |
|---|---|---|---|---|
| | 1 h (N/mm$^2$) | 10 h (N/mm$^2$) | 1 h (N/mm$^2$) | 10 h (N/mm$^2$) |
| Pt | 17 | 10 | — | — |
| Pt Rh 10% | 54 | 38 | 32 | 20 |
| Example 1: Pd In 5% | 25 | 17 | 12 | 8 |
| Example 2: Pd In 10% | 25 | 17 | 10 | 7 |
| Example 3: Pd In 15% | 23 | 16 | 10 | 6 |
| Example 4: Pd Bi 5% | 23 | 15 | 10 | 5.5 |
| Example 5: Pd Bi 15% | 21 | 14 | 10 | 5 |

TABLE II

CREEP STRENGTH AT HIGH TEMPERATURE

| | Creep strength at 1000° C. Load for a rupture time of | | Creep strength at 1200° C. Load for a rupture time of | |
|---|---|---|---|---|
| | 1 h (N/mm$^2$) | 10 h (N/mm$^2$) | 1 h (N/mm$^2$) | 10 h (N/mm$^2$) |
| Pt | 17 | 10 | — | — |
| Pt Rh 10% | 54 | 38 | 32 | 20 |
| Example 6: Pd In 5% | 29 | 20 | 12 | 9 |
| Example 7: Pd In 10% | 31 | 21 | 14 | 9 |
| Example 8: Pd In 15% | 34 | 23 | 12 | 10 |
| Example 9: Pd In 5% W 1% | — | — | 13 | 9 |

The samples of Examples 6 to 9 were treated for 72 h at 1200° C. in air.

EXAMPLES 10 TO 13

Palladium-indium-ruthenium alloys whose compositions are given in Tables IIIa and IIIb are prepared by vacuum melting.

The ingots are hot-forged at a temperature of 1200° C. down to a thickness of 10 mm; they are then cold-rolled down to 1 mm.

The creep properties at high temperature of this family of alloys are particularly remarkable (Table IIIa).

It appears, in fact, that the creep strength of the alloy Pd, In 5, Ru 5 is very clearly similar to that of Pt Rh 10% (Table IIIb).

The tests of corrosion in the presence of molten E glass were carried out at 1200° C. for periods ranging from 100 h to 500 h.

The micrographic observations showed no detectable corrosion.

On account of their very good creep properties at high temperature, the palladium-indium-ruthenium ternary alloys form a particularly preferred family according to the invention. Within this family, preference will be given to the alloys whose indium and ruthenium content is between 10 and 15% by weight, and more particularly to the alloy Pd, In 5, Ru 5, which can currently be considered as the best embodiment of the invention.

TABLE IIIa

| | Creep rupture time (h) 1200° C. | |
|---|---|---|
| Composition | $\sigma = 0.6$ daN/mm$^2$ | $\sigma = 1$ daN/mm$^2$ |
| Pt Rh 10 | 200 | 100 |
| Pd In 10 Ru 0.5 | 40.8 | 6.4 |
| Pd In 10 Ru 1 | 74.2 | 6.2 |
| Pd In 5 Ru 5 | 110 | 45.5 |
| Pd In 5 Ru 10 | 30.6 | 3.2 |

TABLE IIIb

| | Load (in N/mm$^2$) for a rupture time of (temperature 1200° C.) | | |
|---|---|---|---|
| Composition | 1 h | 10 h | 100 h |
| Pt Rh 10 | 32 | 20 | 10 |
| Pd In 5 Ru 5 | 28 | 17 | 7 |

EXAMPLES 14 TO 26

A series of palladium-based alloys whose compositions are collated in Table IV are prepared by vacuum melting.

The ingots are hot-forged at a temperature of 1200° C. down to a thickness of 10 mm. They are then cold-rolled down to 1 mm. The creep strength of the alloys is measured on flat 1 mm thick test-pieces. The characteristics of these various alloys are indicated in the Table. These values show the improvement in creep strength which is brought about by the additions, more particularly of rhodium and iridium.

Tests of corrosion in E glass are carried out at 1200° C. for 100 h. After the tests, the samples are observed under a microscope and show no detectable signs of corrosion.

Furthermore, the following alloys were prepared in the same manner as in Examples 14 to 26:

Pd Ag 5
Pd Ag 10
Pd Cu 20
Pd Cu 30
Pd In 5 Ag 5
Pd In 2 Ag 10
Pd In 5 Cu 10
Pd In 10 Cu 10
Pd Bi 2 Ag 10
Pd Bi 10 Cu 10
Pd In 5 Sn 5
Pd In 5 Sn 10
Pd Bi 5 Sn 10

The characteristics of these alloys are not indicated here, but they demonstrate valuable properties of resistance to corrosion by molten glass.

TABLE IV

| COMPOSITION (%) | Creep rupture time (h) | |
| --- | --- | --- |
|  | $\sigma = 0.6$ daN/mm$^2$ | $\sigma = 1$ daN/mm$^2$ |
| Pd In 5 | 26.1 | 2.5 |
| Pd In 5 Ir 10 | — | 6.7 |
| Pd In 5 Rh 10 | 98 | 15.4 |
| Pd In 5 Pt 10 | 20.3 | 2 |
| Pd In 5 Rh 5 Pt 5 | 90.7 | 14.8 |
| Pd In 5 Ru 5 Rh 5 Pt 5 | 14.1 | 2.4 |
| Pd Bi 10 | 2.1 | — |
| Pd Bi 5 Ru 1 | 4.4 | 0.8 |
| Pd Bi 5 In 1 | 5.3 | 0.8 |
| Pd Bi 5 Ru 5 | 9.3 | 2.4 |
| Pd Bi 5 Rh 10 | 2.1 | 0.5 |
| Pd Bi 5 Pt 10 | 5.4 | 1.3 |
| Pd Bi 5 Rh 5 Pt 5 | 2.9 | 1.1 |
| Pd Bi 5 Ru 1 Rh 5 Pt 5 | — | 0.7 |

The alloys according to the invention which have just been described can be employed to make components used in the glass industry and to protect them against corrosion by molten glass. With this in mind, it is easy to see that at least some parts of these components, especially the parts which may come into contact with molten glass, which is preferably a glass essentially containing no oxides less stable than the oxide of the additional element, such as lead oxide, should be made of an alloy of the type defined above.

It should also be noted that the alloys according to the invention have the particular property of being weldable to themselves.

Consequently, the alloys of the invention can be used to manufacture welded components.

What is claimed is:

1. A spinneret for contacting molten glass in a glass processing installation, a part of said spinneret that contacts said molten glass being fabricated from a palladium alloy consisting essentially of at least 45.0% by weight palladium and at least one first metal selected from the group consisting of indium, bismuth, copper and silver, wherein the amount of indium or bismuth is 2.0% to 20.0% by weight, the amount of copper is 5.0% to 20.0% by weight, the amount of silver is 5.0% to 30.0% by weight and the molten glass contains no oxides less stable than the least stable oxide of a selected first metal, wherein the part of said spinneret has a resistance to corrosion by the molten glass substantially the same as that of platinum-rhodium 10% alloys.

2. The spinneret according to claim 1 fabricated from an alloy containing 80.0–95.0% by weight palladium.

3. The spinneret according to claim 1 fabricated from an alloy in which the first metal is indium.

4. The spinneret according to claim 1 fabricated from an alloy in which the first metal is bismuth.

5. The spinneret according to claim 1 fabricated from an alloy further comprising up to 20.0% by weight of at least one second metal selected from the group consisting of ruthenium, rhodium, iridium, and tin.

6. The spinneret according to claim 1 or 5 fabricated from an alloy further comprising up to 50.0% by weight of palladium.

7. The spinneret according to claim 5 fabricated from a palladium-indium-ruthenium ternary alloy.

8. A metal component for contacting molten glass, said component being fabricated at least in part from a ternary palladium-indium-ruthenium alloy in which the total ruthenium and indium content is 10–15% by weight.

9. The component according to claim 8 fabricated from an alloy containing 5.0% by weight indium and 5.0% by weight ruthenium.

10. A process for preparing at least a part of a metal component for contacting molten glass said component having a resistance to corrosion by said molten glass which is substantially the same as that of platinum-rhodium 10% alloys, comprising preparing a palladium alloy consisting essentially of a ternary palladium-indium-ruthenium alloy, wherein the total ruthenium and indium content of the alloy is 10.0–15.0% by weight, and the molten glass contains no oxides less stable than the least stable oxide of indium; and fabricating at least a part of said component from said alloy.

11. The process according to claim 10, wherein the alloy contains 5.0% by weight indium and 5.0% by weight ruthenium.

12. An apparatus for processing glass, comprising at least one spinneret that come in contact with molten glass during said processing, said spinneret being fabricated from a palladium alloy consisting essentially of at least 45.0% by weight palladium and at least one first metal selected from the group consisting of indium, bismuth, copper and silver, wherein the amount of indium or bismuth is 2.0% to 20.0% by weight, the amount of copper is 5.0% to 20.0% by weight, the amount of silver is 5.0% to 30.0% by weight and the molten glass contains no oxides less stable than the least stable oxide of a selected first metal, wherein the part of said spinneret has a resistance to corrosion by the molten glass substantially the same as that of platinum-rhodium 10% alloys.

13. The apparatus according to claim 12, wherein the first metal is indium.

14. The apparatus according to claim 12, wherein the first metal is bismuth.

15. The apparatus according to claim 12, wherein the alloy further comprises up to 20% by weight of at least one second metal selected from the group consisting of ruthenium, rhodium, iridium and tin.

16. The apparatus according to claim 12, wherein the alloy further comprises up to 50.0% by weight palladium.

17. The apparatus according to claim 15, wherein the alloy is palladium-indium-ruthenium ternary alloy.

18. The apparatus according to claim 17, wherein the total ruthenium and indium content of the alloy is 10.0–15.0% by weight.

19. The apparatus according to claim 18, wherein the alloy contains 5.0% by weight indium and 5.0% by weight ruthenium.

20. A spinneret fabricated from an alloy consisting essentially of at least 45.0% by weight palladium and at least one first metal selected from the group consisting of indium, bismuth, copper and silver, wherein the amount of indium or bismuth is 2.0% to 20.0% by weight, the amount of copper is 5.0% to 30.0% by weight, and the amount of silver is 5.0% to 30.0% by weight.

21. An apparatus for processing glass, comprising at least one metal component that comes in contact with molten glass during said processing, said component being fabricated at least in part from a ternary palladium-indium-ruthenium alloy, wherein the total ruthenium and indium content is from 10.0–15.0% by weight and wherein the part of said metal component has a resistance to corrosion by the molten glass substantially the same as that of platinum-rhodium 10.0% alloys.

22. The apparatus according to claim 21, wherein the alloy contains 5.0% by weight indium and 5.0% by weight ruthenium.

* * * * *

UNITED STATES PATENT AND TRADEMARK OFFICE
CERTIFICATE OF CORRECTION

PATENT NO. : 5,051,235
DATED : September 24, 1991
INVENTOR(S) : Guerlet et al.

It is certified that error appears in the above-identified patent and that said Letters Patent is hereby corrected as shown below:

On the title page, Item 54, <u>AND</u> Col. 1, second line, "INDIUM BISMUTH" should read --INDIUM, BISMUTH--;

First page, line 12 of ABSTRACT, "because is" should read --because it--;

Col. 2, line 32, "glass." should read --glass).--;

Col. 6, line 11, "add" should read --and--;

Col. 6, line 39, "spinneret" should read --spinneret or bushing--;

Col. 9, line 61, "palladium" should read --platinum--;

Col. 10, line 18, "come" should read --comes--;

Col. 10, line 43, "alloy is" should read --alloy is a--;

UNITED STATES PATENT AND TRADEMARK OFFICE
CERTIFICATE OF CORRECTION

PATENT NO. : 5,051,235

DATED : September 24, 1991

INVENTOR(S) : Guerlet, et al

It is certified that error appears in the above-identified patent and that said Letters Patent is hereby corrected as shown below:

Col. 10, line 49, "fabricated" should read --fabricated at least in part--.

Signed and Sealed this

Twenty-seventh Day of April, 1993

Attest:

MICHAEL K. KIRK

Attesting Officer     Acting Commissioner of Patents and Trademarks